United States Patent
Hviid et al.

(10) Patent No.: US 12,471,163 B2
(45) Date of Patent: Nov. 11, 2025

(54) SIDELINK COMMUNICATIONS IN CELLULAR COMMUNICATION NETWORKS

(71) Applicant: NOKIA TECHNOLOGIES OY, Espoo (FI)

(72) Inventors: Jan Torst Hviid, Klarup (DK); Benny Vejlgaard, Gistrup (DK); Oana-Elena Barbu, Aalborg (DK); Renato Barbosa Abreu, Aalborg (DK); Thomas Haaning Jacobsen, Nørresundby (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 536 days.

(21) Appl. No.: 17/941,422

(22) Filed: Sep. 9, 2022

(65) Prior Publication Data
US 2023/0115908 A1 Apr. 13, 2023

Related U.S. Application Data

(60) Provisional application No. 63/246,401, filed on Sep. 21, 2021.

(51) Int. Cl.
*H04W 76/15* (2018.01)
*H04W 56/00* (2009.01)
*H04W 76/14* (2018.01)

(52) U.S. Cl.
CPC ....... *H04W 76/15* (2018.02); *H04W 56/0045* (2013.01); *H04W 76/14* (2018.02)

(58) Field of Classification Search
CPC ......... H04W 56/0015; H04W 56/0045; H04W 76/14; H04W 76/15
See application file for complete search history.

(56) References Cited

U.S. PATENT DOCUMENTS

| | | | |
|---|---|---|---|
| 9,439,039 B1 * | 9/2016 | Patil | H04W 4/023 |
| 9,913,233 B2 * | 3/2018 | Abedini | H04W 56/0015 |

(Continued)

FOREIGN PATENT DOCUMENTS

| | | |
|---|---|---|
| CN | 111567105 A | 8/2020 |
| CN | 112585886 A | 3/2021 |

(Continued)

OTHER PUBLICATIONS

3GPP TS 22.261 V18.3.0 (Jun. 2021), Technical Specification, 3rd Generation Partnership Project; Technical Specification Group Services and System Aspects; Service requirements for the 5G system; Stage 1 (Release 18), Jun. 2021.

(Continued)

*Primary Examiner* — Eric Nowlin
(74) *Attorney, Agent, or Firm* — SQUIRE PATTON BOGGS (US) LLP

(57) ABSTRACT

According to an example aspect of the present invention, there is provided a method comprising, determining, by a network node, a timing offset ($TO_A$) of a first wireless link, determining, by the network node, a timing offset ($TO_B$) of a second wireless link, determining, by the network node, a timing offset ($TO_C$) of a third wireless link, calculating, by the network node, a timing calibration value of the first sidelink device using the timing offset ($TO_A$) of the first wireless link, the timing offset ($TO_B$) of the second wireless link and the timing offset ($TO_C$) of the third wireless link and transmitting, by the network node, at least the timing calibration value of the first sidelink device.

14 Claims, 12 Drawing Sheets

(56) References Cited

U.S. PATENT DOCUMENTS

| | | | | |
|---|---|---|---|---|
| 10,028,204 | B2* | 7/2018 | Blankenship | H04W 8/005 |
| 11,178,565 | B2* | 11/2021 | Tseng | H04W 24/10 |
| 11,277,180 | B1* | 3/2022 | Raghavan | H01Q 3/2617 |
| 11,671,932 | B2* | 6/2023 | Xu | H04W 74/0833 370/329 |
| 11,974,335 | B2* | 4/2024 | Bao | H04L 67/535 |
| 12,127,155 | B2* | 10/2024 | Goyal | H04W 64/00 |
| 12,207,145 | B2* | 1/2025 | Teyeb | H04W 36/0058 |
| 2017/0034800 | A1* | 2/2017 | Abedini | H04W 56/0015 |
| 2017/0034804 | A1* | 2/2017 | Jiang | H04L 5/0094 |
| 2020/0059879 | A1 | 2/2020 | Nam et al. | |
| 2021/0227481 | A1* | 7/2021 | Xu | H04W 56/005 |
| 2021/0282100 | A1* | 9/2021 | Duan | H04W 56/0015 |
| 2022/0201774 | A1* | 6/2022 | Bao | H04W 72/56 |
| 2022/0295442 | A1* | 9/2022 | Goyal | H04W 8/005 |
| 2022/0393820 | A1* | 12/2022 | Keating | H04W 76/14 |
| 2023/0034433 | A1* | 2/2023 | Zorgui | H04L 5/0094 |
| 2023/0050701 | A1* | 2/2023 | Bao | G01S 5/0236 |
| 2023/0057620 | A1* | 2/2023 | Wu | H04W 76/14 |
| 2023/0217391 | A1* | 7/2023 | Prakash | H04W 56/0015 370/503 |
| 2023/0262624 | A1* | 8/2023 | Abreu | H04W 56/0015 370/350 |
| 2024/0004058 | A1* | 1/2024 | Duan | G01S 13/878 |
| 2024/0365182 | A1* | 10/2024 | Teyeb | H04W 36/0058 |
| 2024/0381306 | A1* | 11/2024 | Ko | G01S 13/765 |
| 2025/0048321 | A1* | 2/2025 | Goyal | G01S 5/10 |

FOREIGN PATENT DOCUMENTS

| | | | | |
|---|---|---|---|---|
| CN | 114375600 | A * | 4/2022 | |
| EP | 3332563 | B1 * | 4/2022 | |
| JP | 2022545389 | A * | 10/2022 | |
| TW | I881974 | B * | 5/2025 | |
| WO | WO-2017023474 | A1 * | 2/2017 | |
| WO | WO-2021030583 | A1 * | 2/2021 | |
| WO | 2021076029 | A1 | 4/2021 | |
| WO | 2021118756 | A1 | 6/2021 | |
| WO | WO-2021150605 | A1 * | 7/2021 | H04W 74/0833 |
| WO | WO-2022155013 | A1 * | 7/2022 | |

OTHER PUBLICATIONS

3GPP TS 22.261 V17.7.0 (Jun. 2021), Technical Specification, 3rd Generation Partnership Project; Technical Specification Group Services and System Aspects; Service requirements for the 5G system; Stage 1 (Release 17), Jun. 2021.

3GPP TS 22.186 V16.2.0 (Jun. 2019), Technical Specification, 3rd Generation Partnership Project; Technical Specification Group Services and System Aspects; Enhancement of 3GPP support for V2X scenarios; Stage 1 (Release 16), Jun. 2019.

Extended European Search Report dated Feb. 3, 2023, corresponding to European Patent Application No. 22191941.8.

Qualcomm Incorporated: "On gNB requirements for NR positioning", 3GPP Draft; R4-2000736, 3rd Generation Partnership Project (3GPP), Mobile Competence Centre ; 650, Route Des Lucioles ; F-06921 Sophia-Antipolis Cedex ; France vol. RAN WG4, Feb. 14, 2020.

Chinese Office Action, with machine English translation, corresponding to CN Application No. 202211141368.0, dated Jul. 18, 2025.

* cited by examiner

| Example of calculating the timing error | | | | | | |
|---|---|---|---|---|---|---|
| Links | A | | B | | C | |
| | SCS 30KHz | SCS 120 KHz | SCS 30KHz | SCS 120 KHz | SCS 30KHz | SCS 120 KHz |
| Derriving the timing error in the devices (The values are estimated and just for the example) | Values in ns | | Values in ns | | Values in ns | |
| Propagation delay (PD) | 100 | 100 | 100 | 100 | 100 | 100 |
| gNB TX time alignment error (TAE) | 32,5 | 32,5 | 32,5 | 32,5 | | |
| SL1 Downlink Frame Synchronization error (DFSE) | 100 | 100 | | | 100 | 100 |
| SL2 Downlink Frame Synchronization error (DFSE) | | | 100 | 100 | 100 | 100 |
| Asymmetric UL/DL propagation delay (APD) | 0 | 0 | 0 | 0 | 0 | 0 |
| gNB UL Receive Timing Error (gNB_Te) | 100 | 100 | 100 | 100 | | |
| Example of estimated timing delay by the gNB or sidelink. No use of TA and use accurate TS with use of distance for calibration | 432,5 | 432,5 | 432,5 | 432,5 | 400 | 400 |
| Known timing delay due to fixed | 200 | 200 | 200 | 200 | 200 | 200 |
| calculated timing error for the link A, B | 232,5 | 232,5 | 232,5 | 232,5 | 200 | 200 |
| Timing error calibration | | | | | | |
| Timing calibration value for Sidelink 1 | | | | | 100 | 100 |
| Timing calibration value for Sidelink 2 | | | 100 | 100 | | |
| Timing calibration value for gNB (BS) | 132,5 | 132,5 | | | | |

FIGURE 10

| Example of calculating the timing error without calibration | | | | | | |
|---|---|---|---|---|---|---|
| Links | gNB - UE | | SL1-UE | | SL2-UE | |
| | SCS 30kHz | SCS 120 KHz | SCS 30kHz | SCS 120 KHz | SCS 30kHz | SCS 120 KHz |
| | Values in ns | | Values in ns | | Values in ns | |
| Sidelink syncronisation accuracy (S_Sync) | | | 0 | 0 | 0 | 0 |
| gNB TX time alignment error (TAE) | 32,5 | 32,5 | | | | |
| SL1 Downlink Frame Synchronization error (DFSE) | | | 100 | 100 | | |
| SL2 Downlink Frame Synchronization error (DFSE) | | | | | 100 | 100 |
| UE Downlink Frame Synchronization error (DFSE) | 100 | 100 | 100 | 100 | 100 | 100 |
| Asymmetric UL/DL propagation delay (APD) | 0 | 0 | 0 | 0 | 0 | 0 |
| gNB UL Receive Timing Error (Te) | 100 | 100 | | | | |
| Timing error and position accuracy for the UE | | | | | | |
| Timing error | 116,25 | 116,25 | 100 | 100 | 100 | 100 |
| Accuracy in meter | 34,875 | 34,875 | 30 | 30 | 30 | 30 |

FIGURE 11

Example of calculating the timing error with calibration

| Links | gNB - UE | | SL1-UE | | SL2-UE | |
|---|---|---|---|---|---|---|
| | SCS 30kHz | SCS 120 kHz | SCS 30kHz | SCS 120 kHz | SCS 30kHz | SCS 120 kHz |
| | Values in ns | | Values in ns | | Values in ns | |
| Sidelink syncronisation accuracy (S_Sync) | | | 0 | 0 | 0 | 0 |
| Timing compensation (T_Comp) | 132,5 | 132,5 | 100 | 100 | 100 | 100 |
| gNB TX time alignment error (TAE) | 32,5 | 32,5 | | | | |
| SL1 Downlink Frame Synchronization error (DFSE) | | | 100 | 100 | | |
| SL2 Downlink Frame Synchronization error (DFSE) | | | | | 100 | 100 |
| UE Downlink Frame Synchronization error (DFSE) | 100 | 100 | 100 | 100 | 100 | 100 |
| Asymmetric UL/DL propagation delay (APD) | 0 | 0 | 0 | 0 | 0 | 0 |
| gNB UL Receive Timing Error (Te) | 100 | 100 | | | | |
| Timing error and position accuracy for the UE | | | | | | |
| Timing error | 50 | 15 | 50 | 15 | 50 | 15 |
| Accuracy in meter | 15 | | 15 | | 15 | |

FIGURE 12

SIDELINK COMMUNICATIONS IN CELLULAR COMMUNICATION NETWORKS

CROSS REFERENCE TO RELATED APPLICATION

This application claims the benefit of U.S. Provisional Application No. 63/246,401, filed Sep. 21, 2021. The entire content of the above-referenced application is hereby incorporated by reference.

FIELD

Various example embodiments relate in general to cellular communication networks and more specifically, to sidelink communications in such networks.

BACKGROUND

Sidelink, SL, is a direct communication link between User Equipment, UEs, in a cellular communication network and UEs can communicate via a SL without going through a Base Station, BS. Communication over the SL may be enabled in various cellular communication networks, such as in cellular communication networks operating according to 5G radio access technology. 5G radio access technology may also be referred to as new radio, NR, access technology. 3rd generation partnership project, 3GPP, develops standards for 5G/NR and some topics in the 3GPP discussions are related to SL communications. According to the discussions there is a need to provide improved methods, apparatuses and computer programs related to the use of SL. Such improvements may be exploited in other cellular communication networks as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus, comprising means for determining a timing offset ($TO_A$) of a first wireless link, wherein the first wireless link is a link between a wireless network node and a first sidelink device, and the timing offset ($TO_A$) of the first wireless link is based on a calculated two-way delay of the first wireless link and a measured two-way delay of the first wireless link, means for determining a timing offset ($TO_B$) of a second wireless link, wherein the second wireless link is a link between the wireless network node and a second sidelink device, and the timing offset ($TO_B$) of the second wireless link is based on a calculated two-way delay of the second wireless link and a measured two-way delay of the second wireless link, means for determining a timing offset ($TO_C$) of a third wireless link, wherein the third wireless link is a link between the first sidelink device and the second sidelink device and the timing offset ($TO_C$) of the third wireless link is based on a calculated two-way delay of the third wireless link and a measured two-way delay of the third wireless link, means for calculating a timing calibration value of the first sidelink device using the timing offset ($TO_A$) of the first wireless link, the timing offset ($TO_B$) of the second wireless link and the timing offset ($TO_C$) of the third wireless link and means for transmitting at least the timing calibration value of the first sidelink device. The apparatus of the first aspect may comprise a network node, or a control device configured to control the functioning thereof, possibly when installed therein.

According to a second aspect of the present invention, there is provided an apparatus, comprising means for receiving from a network node a timing calibration value of the first sidelink device, the timing calibration value being based on a timing offset ($TO_A$) of a first wireless link, a timing offset ($TO_B$) of a second wireless link and a timing offset ($TO_C$) of a third wireless link, wherein the first wireless link is a link between a wireless network node and the first sidelink device, the second wireless link is a link between the wireless network node and a second sidelink device and the third wireless link is a link between the first sidelink device and the second sidelink device and means for compensating transmission and/or reception using the timing calibration value. The apparatus may comprise the first sidelink device, or a control device configured to control the functioning thereof, possibly when installed therein.

According to a third aspect of the present invention, there is provided a first method, comprising determining, by a network node, a timing offset ($TO_A$) of a first wireless link, wherein the first wireless link is a link between a wireless network node and a first sidelink device, and the timing offset ($TO_A$) of the first wireless link is based on a calculated two-way delay of the first wireless link and a measured two-way delay of the first wireless link, determining, by the network node, a timing offset ($TO_B$) of a second wireless link, wherein the second wireless link is a link between the wireless network node and a second sidelink device, and the timing offset ($TO_B$) of the second wireless link is based on a calculated two-way delay of the second wireless link and a measured two-way delay of the second wireless link, determining, by the network node, a timing offset ($TO_C$) of a third wireless link, wherein the third wireless link is a link between the first sidelink device and the second sidelink device and the timing offset ($TO_C$) of the third wireless link is based on a calculated two-way delay of the third wireless link and a measured two-way delay of the third wireless link, calculating, by the network node, a timing calibration value of the first sidelink device using the timing offset ($TO_A$) of the first wireless link, the timing offset ($TO_B$) of the second wireless link and the timing offset ($TO_C$) of the third wireless link and transmitting, by the network node, at least the timing calibration value of the first sidelink device. The first method may be performed by the network node, or a control device configured to control the functioning thereof, possibly when installed therein.

According to a fourth aspect of the present invention, there is provided a second method comprising, receiving from a network node, by a first sidelink device, a timing calibration value of the first sidelink device, the timing calibration value being based on a timing offset ($TO_A$) of a first wireless link, a timing offset ($TO_B$) of a second wireless link and a timing offset ($TO_C$) of a third wireless link, wherein the first wireless link is a link between a wireless network node and the first sidelink device, the second wireless link is a link between the wireless network node and a second sidelink device and the third wireless link is a link between the first sidelink device and the second sidelink device and compensating, by the first sidelink device, transmission and/or reception using the timing calibration value.

The second method may be performed by the first sidelink device, or a control device configured to control the functioning thereof, possibly when installed therein.

According to a fifth aspect of the present invention, there is provided an apparatus comprising at least one processing core, at least one memory including computer program code, the at least one memory and the computer program code being configured to, with the at least one processing core, cause the apparatus at least to perform, determine a timing offset ($TO_A$) of a first wireless link, wherein the first wireless link is a link between a wireless network node and a first sidelink device, and the timing offset ($TO_A$) of the first wireless link is based on a calculated two-way delay of the first wireless link and a measured two-way delay of the first wireless link, determine a timing offset ($TO_B$) of a second wireless link, wherein the second wireless link is a link between the wireless network node and a second sidelink device, and the timing offset ($TO_B$) of the second wireless link is based on a calculated two-way delay of the second wireless link and a measured two-way delay of the second wireless link, determine a timing offset ($TO_C$) of a third wireless link, wherein the third wireless link is a link between the first sidelink device and the second sidelink device and the timing offset ($TO_C$) of the third wireless link is based on a calculated two-way delay of the third wireless link and a measured two-way delay of the third wireless link, calculate a timing calibration value of the first sidelink device using the timing offset ($TO_A$) of the first wireless link, the timing offset ($TO_B$) of the second wireless link and the timing offset ($TO_C$) of the third wireless link and transmit at least the timing calibration value of the first sidelink device. The apparatus may comprise a network node, or a control device configured to control the functioning thereof, possibly when installed therein.

According to a sixth aspect of the present invention, there is provided an apparatus comprising at least one processing core, at least one memory including computer program code, the at least one memory and the computer program code being configured to, with the at least one processing core, cause the apparatus at least to perform, receive from a network node a timing calibration value of the first sidelink device, the timing calibration value being based on a timing offset ($TO_A$) of a first wireless link, a timing offset ($TO_B$) of a second wireless link and a timing offset ($TO_C$) of a third wireless link, wherein the first wireless link is a link between a wireless network node and the first sidelink device, the second wireless link is a link between the wireless network node and a second sidelink device and the third wireless link is a link between the first sidelink device and the second sidelink device and compensate transmission and/or reception using the timing calibration value. The apparatus may comprise the first sidelink device, or a control device configured to control the functioning thereof, possibly when installed therein.

According to a seventh aspect of the present invention, there is provided a non-transitory computer readable medium having stored thereon a set of computer readable instructions that, when executed by at least one processor, cause an apparatus to at least perform the first or the second method. According to an eighth aspect of the present invention, there is provided a computer program comprising instructions which, when the program is executed by an apparatus, cause the apparatus to carry out the first or the second method.

BRIEF DESCRIPTION OF THE DRAWINGS

FIG. 10 illustrates an example of calculating timing errors in accordance with at least some example embodiments;

FIG. 11 illustrates an example of calculating timing errors without calibration in accordance with at least some example embodiments; and FIG. 12 illustrates an example of calculating timing errors with calibration in accordance with at least some example embodiments.

EXAMPLE EMBODIMENTS

Embodiments of the present invention provide enhancements for sidelink communications in cellular communication networks. More specifically, embodiments of the present invention enable estimation of timing calibration values for a wireless network node, a first Sidelink, SL, device and a second SL device. For instance, a timing calibration for the first SL device may be calculated using timing offsets of wireless links between the wireless network, the first SL device and the second SL device, wherein each timing offset may be determined by subtracting a calculated two-way delay of a corresponding wireless link from a measured two-way delay of the corresponding link. Thus, the calculation of the timing calibration values is enabled without relying, for example, on a Global Navigation Satellite System, GNSS.

Figure 1:
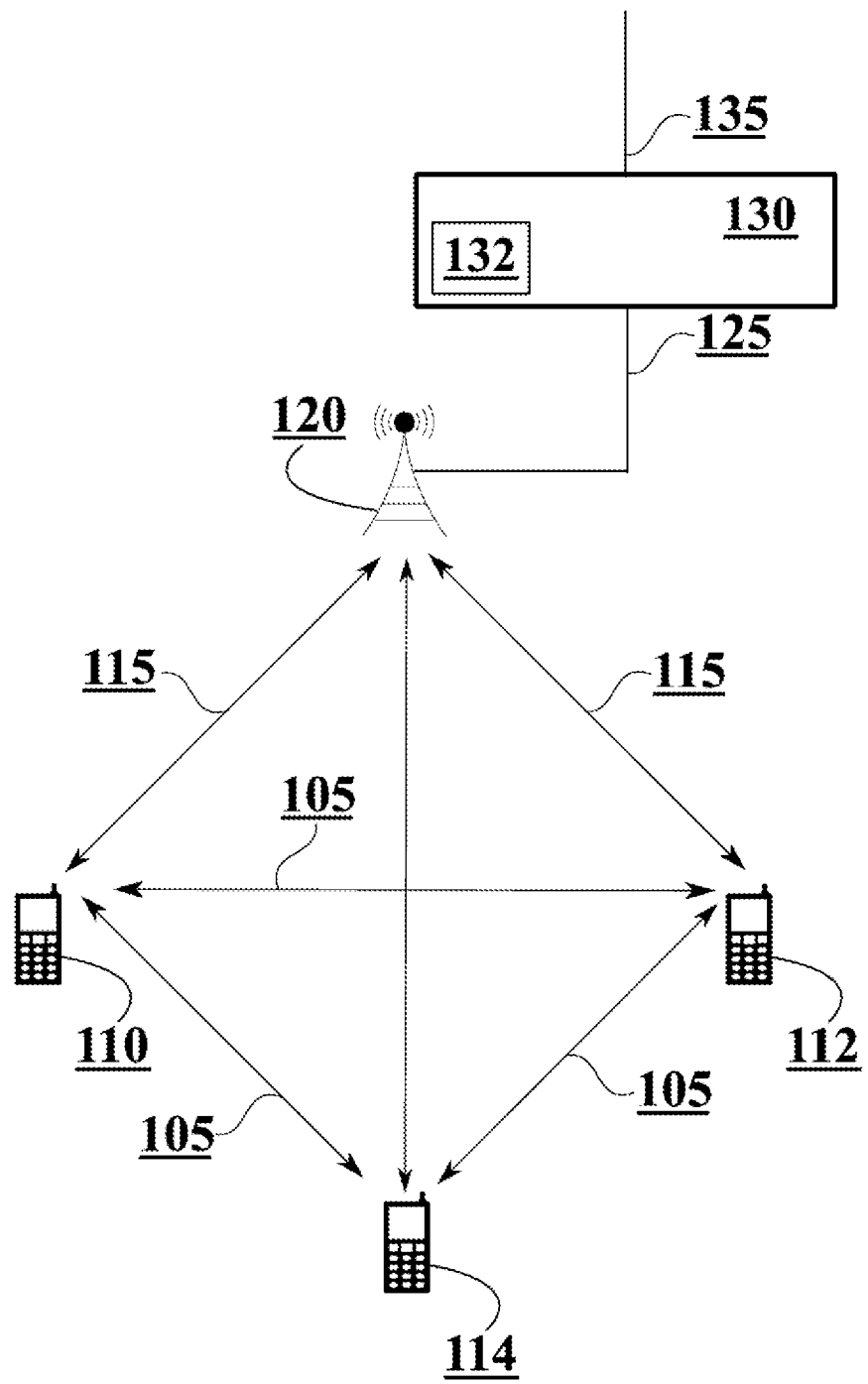
FIG. 1 illustrates a communication network in accordance with at least some example embodiments.

FIG. 1 illustrates a communication network in accordance with at least some example embodiments. According to the example scenario of FIG. 1, there may be a cellular communication network comprising three SL devices, configured to communicate using SL communications, and network nodes. More specifically, the cellular communication network of FIG. 1 comprises first SL device 110, second DL device 112, third SL device 114, Base Station, BS, 120 and core network 130. BS 120 may be referred to as a wireless network node, i.e., even though BS 120 is used as an example, any wireless network node in general, such as a relay, may perform tasks of BS 120 in accordance with embodiments of the invention. In some embodiments, core network 130 may comprise network node 132, such as a Location Management Function, LMF.

First SL device 110 and second SL device 112 may be connected to each other via air interface 105. Similarly, first SL device 110 and third SL device 114 may be connected to each other via air interface 105. Second SL device 112 and third SL device 114 may be connected to each other via air interface 105 as well. First SL device 110 and second SL device 112 may be further connected to BS 120, or some other BS, via air interface 115. Third SL device 114 may, or may not, be connected to BS 120.

SL devices 110, 112 and 114 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal. BS 120 may be a network entity that configures some or all control information and allocates at least some resources for SL devices 110, 112 and 114. In some example embodiments, BS 120 may be considered as a serving node for SL devices 110 and 112.

Air interface 105 between SL devices 110, 112 and 114 may be configured in accordance with a Radio Access Technology, RAT, which SL devices 110, 112 and 114 are configured to support. Similarly, air interface 115 between for example first SL device 110 and BS 120 may be configured in accordance with a RAT which first SL device 110 and BS 120 are configured to support. Examples of cellular RATs include Long Term Evolution, LTE, New Radio, NR, which may also be known as fifth generation, 5G, radio access technology and MulteFire. A cellular RAT may be standardized by the 3rd Generation Partnership Project, 3GPP, for example. Hence, SL devices 110, 112 and 114, and BS 120 as well, may be configured to operate according to the 3GPP standards.

BS 120 may be connected, directly or via at least one intermediate node, with core network 130 via wired interface 125. Core network 130 may be, in turn, coupled via interface 135 with another network (not shown in FIG. 1), via which connectivity to further networks may be obtained, for example via a worldwide interconnection network. BS 120 may be connected, directly or via at least one intermediate node, with core network 130 or with another core network.

Embodiments of the present invention may be related to using SL based UE-to-UE communication between SL devices 110, 112 and 114. A SL may refer to a direct communication link between UEs 110, 112 and 114 in a cellular communication network and UEs can communicate via the SL without going through BS 120. That is, in some embodiments, SL devices 110, 112 and 114 may be referred to as Device-to-Device, D2D, wireless terminals in general, including D2D User Equipments, UEs, or D2D terminals in non-cellular communication networks, such as Wireless Local Area Networks, WLANs.

As a first example, embodiments of the present invention may be related to positioning and applied for example in the context of Vehicle-to-Everything, V2X, communications. For instance, in case of 3GPP specifications, V2X positioning requirements can be found at least from 3GPP standard specification TS 22.261 V18.3.0 (June 2021) or TS 22.261 V17.7.0 (June 2021), wherein high accuracy positioning requirements for the 5G system and these requirements are summarized in Clause 7.3.2.2 with a note that the requirements include V2X. Seven different positioning service levels are defined in Table 7.3.2.2-1 of 3GPP standard specification TS 22.261 V18.3.0 (June 2021) or TS 22.261 V17.7.0 (June 2021) in terms of the horizontal and vertical accuracy, positioning service availability, and positioning service latency. 3GPP standard specification TS 22.186 V16.2.0 (June 2019) specifies the relative lateral positioning requirement for general V2X use cases and the relative longitudinal positioning requirement for the platooning use case in its Clause 5.1 and 5.2. Positioning requirements for V2X services may be divided into for example three groups, comprising a first group with tens of meters accuracy, the second group with lane level accuracy, and the third group with below meter level accuracy. Also, it may be necessary to provide positioning technology which supports advanced V2X applications working even in various out-of-coverage scenarios.

The positioning requirements in V2X may depend on a service. Positioning services should be provided indoors, outdoors, in tunnel areas, and for velocities up to 250 km/h. As long as a sidelink device operates a V2X application having positioning requirements, the requirements should be fulfilled when the SL device is inside the network coverage as well as when it is outside the network coverage. The requirements should be also fulfilled when the GNSS-based positioning is not available or not accurate enough.

As a second example, embodiments of the present invention may be applied in the context of public safety. Also in the context of public safety, positioning services should be provided both indoors and outdoors, and the requirements should be fulfilled when the sidelink device is inside the network coverage as well as when it is outside the network coverage. The requirements should be also fulfilled when the GNSS-based positioning is not available or not accurate enough.

In an environment densely populated with BSs and good coverage, quite good timing accuracy may be expected to be achievable which enables estimating a correct position of moving devices in such an environment. However, in a limited BS deployment scenario the limitation of using SL for estimating the position of the moving device is the accuracy of the accumulated SL timing estimates. Thus, accurate timing would be required.

Accurate timing for a SL device may be achieved using GNSS, to get a better positioning estimate and accurate time reference. GNSS may work for SL devices if space, price, and "open air" are not issues, but for a SL device in indoor, street canyon, disaster area and others, wherein a GNSS signal may be impossible to detect. Also, for a SL device mounted in a smart traffic-light where space may be an issue, the solution to add GNSS is not a feasible option. Another issue related to the use of GNSS only is that it is highly prone to jamming/spoofing.

Embodiments of the present invention therefore enable accurate timing calibration for SL devices, e.g., for positioning at least in partial and out of coverage environments. In some embodiments, a SL assisted scenario may be considered, wherein the SL devices, such as road side units, may be static in coverage and within Line-of-Sight, LoS.

Figure 2:
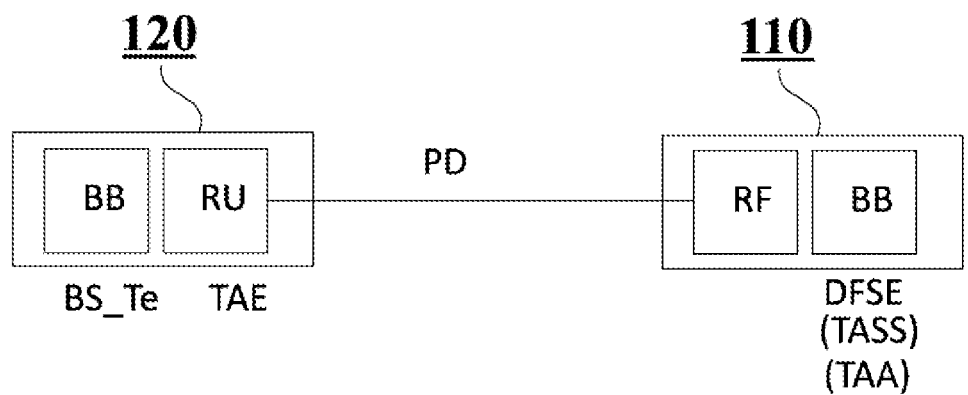
FIG. 2 illustrates timing error sources in accordance with at least some example embodiments.

FIG. 2 illustrates an example of timing error sources in accordance with at least some example embodiments. Various timing error sources may affect accuracy of timing. For instance, in case of a communication between first SL device 110 and BS 120, at the side of BS 120 BS receive timing error, BS_Te, and BS Time Alignment Error, TAE, may cause timing errors. In addition, in such a case, at the side of first SL device 110, Downlink Frame Synchronization Error, DFSE, Time Alignment Step Size, TASS, granularity of Time Alignment Adjustment, TAA, accuracy may cause timing errors. The accumulated timing error will then again affect the timing accuracy for the sidelink device and thereby affect the possible position estimate. In FIG. 2, Propagation Delay, PD, Baseband, BB, unit, Radio Unit, RU, and Radio Frequency, RF, unit are shown.

Embodiments of the present invention therefore improve timing accuracy by minimizing the timing error of SL devices in a network configured with at least one BS 120 and at least two SL devices, such as SL devices 110 and 112. Timing calibration between BS 120 and SL devices 110 and 112 may be performed and a timing error between BS 120 and SL devices 110 and 112 may be minimized. By minimizing the timing error of SL devices 110 and 112, it is then possible for example to perform a more accurate location estimate for any moving third SL device 114, such as a UE, robot or car, in an environment where SL devices 110 and 112 are used in the positioning configuration.

In some embodiments, SL devices 110 and 112 may be static. Also, positions of BS 120 and SL devices 110 and 112 may be known. In some embodiments, SL devices 110 and 112 may be connected to a same receiving unit and antenna panel of BS 120, to ensure same latency through the receiving unit of BS 120 for both SL devices 110 and 112.

Figure 3:
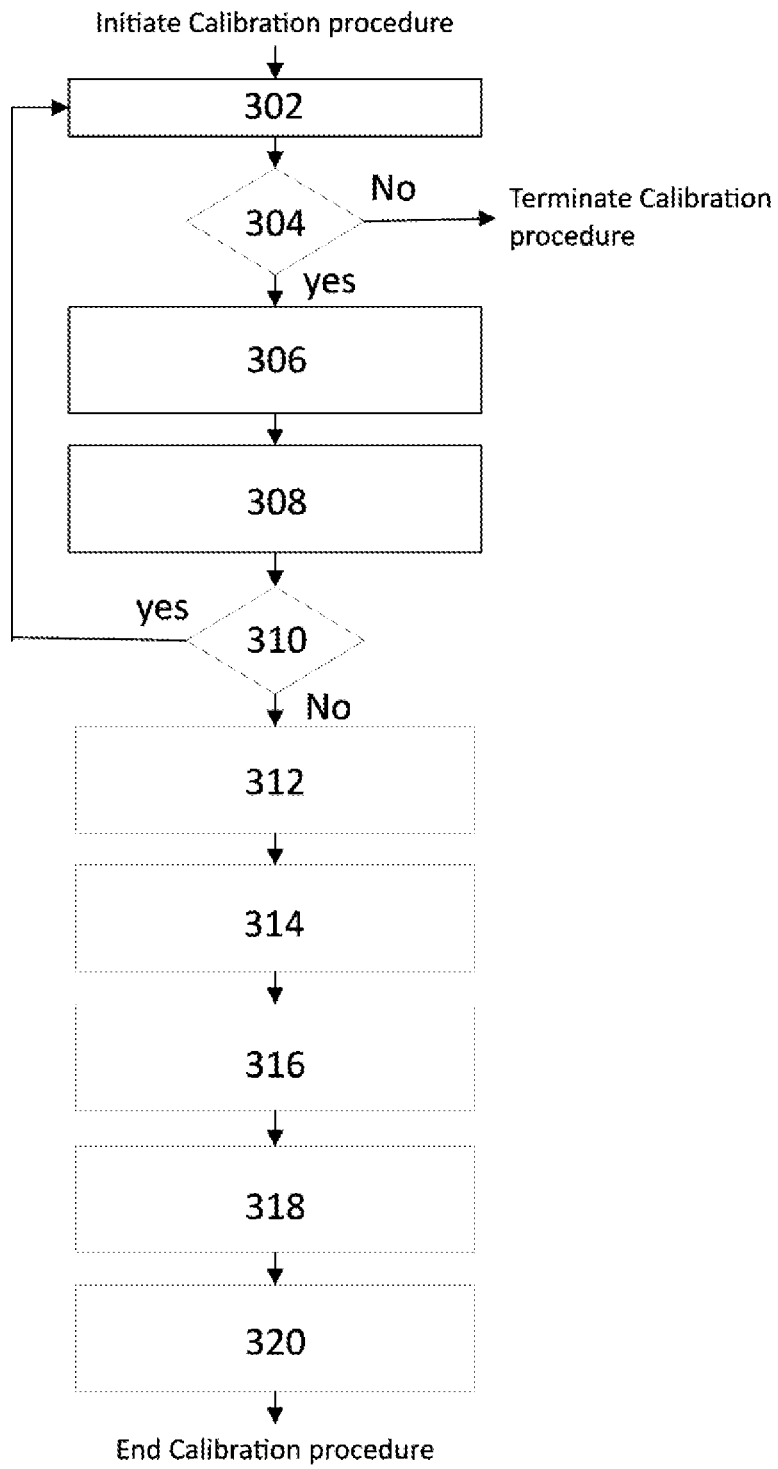
FIG. 3 illustrates a calibration procedure in accordance with at least some example embodiments.

FIG. 3 illustrates an example of a calibration procedure in accordance with at least some example embodiments. The calibration procedure may be for example triggered at initial boot-up of SLs and re-triggered in case of unexpected timing drift which may be monitored by BS 120 and/or SL devices 110 and 112, by having the knowledge of timing tolerances of the components. Alternatively, the calibration may be re-triggered with fixed interval. The positions of BS 120 and SL devices 110 and 112 may be known before the calibration procedure is initiated. The calibration procedure may be performed by any network node, such as LMF 132, even though BS 120 is used as an example associated with FIG. 3.

At step 302, BS 120 may determine that there is a connection between BS 120 and at least SL devices 110 and 112. After that, at step 304, BS 120 may check whether there is a LoS connection on wireless links between BS 120 and at least SL devices 110 and 112. If there is no LoS connection on at least one of the links, the calibration procedure may be terminated. However, if the LOS connections exist, BS 120 may decide to proceed with the calibration procedure and, at step 306, BS 120 may measure a two-way delay of a first wireless link, wherein the first wireless link is a link between first SL device 110 and BS 120. In addition, BS 120 may measure a two-way delay of a second wireless link, wherein the second wireless link is a link between second SL device 112 and BS 120. The SLs may synchronized to BS 120.

At step 308, BS 120 may compare a calculated two-way delay of the first wireless link to the measured two-way delay of the first wireless link, to determine a timing offset of the first wireless link. Also, BS 120 may compare a calculated two-way delay of the second wireless link and BS 120 to the measured two-way delay of the second wireless link, to determine a timing offset of the second wireless link. In general, a two-way delay of wireless a link may be calculated based on positions of the devices, by first calculating a distance between the devices and calculating a theoretical PD of the wireless link by dividing the distance with the speed of light. The two-way delay may be then calculated by multiplying the PD by two.

At step 310, BS 120 may determine whether there are more SL devices connected to BS 120. If yes, BS 120 may perform steps 302-308 for those SL devices as well. If not, BS 120 may decide to proceed with the calibration procedure and, at step 312, BS 120 may request for example first SL device 110 to measure a two-way delay between SL devices 110 and 112. BS 120 may nominate first SL device 110 as a master to perform delay measurements on a third wireless link, wherein the third wireless link is a SL between SL device 110 and SL device 112. Alternatively, the measurements may be performed by both SL devices 110 and 112. At step 314, first SL device 110 may measure the two-way delay of the third wireless link. At step 316, first SL device 110 may transmit the measured two-way delay to BS 120.

At step 318, BS 120 may compare a calculated two-way delay of the third wireless link to the measured two-way delay of the third wireless link, to determine a timing offset of the third wireless link. After that, BS 120 may calculate individual timing calibration values for itself and for both, SL device 110 and 112, using the timing offset (A) of the first wireless link, the timing offset (B) of the second wireless link and the timing offset (C) of the third wireless link. At step 320, BS 120 may transmit the calibration values to SL devices 110 and 112, to be used in timing compensation.

Figure 4:
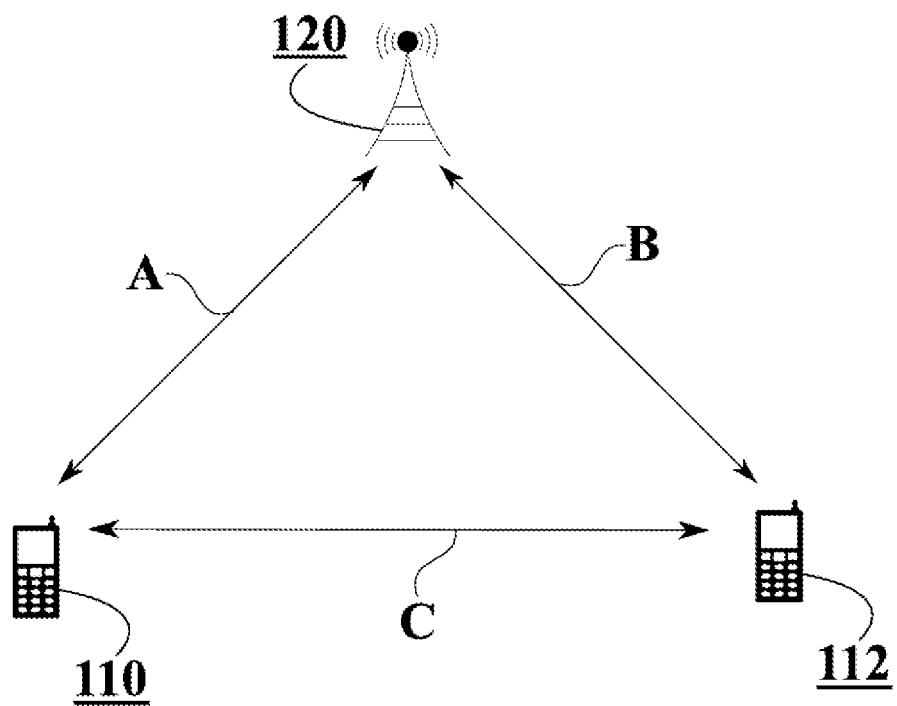
FIG. 4 illustrates a first network scenario for calculation of timing calibration values in accordance with at least some example embodiments.

FIG. 4 illustrates an example network scenario for calculation of timing calibration values in accordance with at least some example embodiments. In FIG. 4, a wireless communication link between BS 120 and SL device 110 is denoted by A, a wireless communication link between BS 120 and SL device 112 is denoted by B and a wireless communication link between SL devices 110 and 112 is denoted by C. The timing calibration value for each of SL devices 110 and 112 and BS 120 may be calculated as follows.

A timing offset for the first wireless link A, second wireless link B and third wireless link C may be calculated for example by exploiting the calibration procedure described in connection with FIG. 3. Each measured two-way delay may comprise receiver errors, transmitter errors and 2 times the PD of the wireless communication link in question. The two-way delays for links A and B may be measured by BS 120 while the two-way delay for link C may be measured by a master SL device, such as SL device 110. A theoretical two-way delay for each link may be calculated based on known positions of BS 120 and SL devices 110 and 112, as the known positions may be used to calculate a PD for each link using the speed of light and distance. The theoretical two-way delays may be calculated by multiplying the calculated PDs by two.

A timing offset for a link may be then determined based on a calculated two-way delay of the link and a measured two-way delay of link. That is, the timing offset for the link may be determined by subtracting the calculated, theoretical two-delay from the measured two-way delay. For instance, the timing offset $TO_A$ of link A may be calculated as follows:

$$TO_A = D_A - PD_A, \quad (1)$$

wherein $D_A$ is a measured two-delay of link A and $PD_A$ is a calculated two-way delay of link A.

The timing offset link of A may comprise at least the following delays:

$$TO_A = BS_{TX} + PD_A + SL1_{RX} + SL1_{TX} + PD_A + BS_{RX} - 2*PD_A$$

$$TO_A = = BS_{TX} + SL1_{RX} + SL1_{TX} + BS_{RX} \quad (2)$$

The timing offset of link B may comprise at least the following delays:

$$TO_B = BS_{TX} + PD_B + SL2_{RX} + SL2_{TX} + PD_B + BS_{RX} - 2*PD_B$$

$$TO_B = = BS_{TX} + SL2_{RX} + SL2_{TX} + BS_{RX} \quad (3)$$

The timing offset of link C may comprise at least the following delays:

$$TO_C = SL1_{TX} + PD_C + SL2_{RX} + SL2_{TX} + PD_C + BS_{RX} - 2*PD_C$$

$$TO_C = = SL1_{TX} + SL2_{RX} + SL2_{TX} + SL1_{RX} \quad (4)$$

Then, timing calibration value for each link may be calculated using the timing offset ($TO_A$) of the first wireless link, the timing offset ($TO_B$) of the second wireless link and the timing offset ($TO_C$) of the third wireless link.

The timing calibration value of first SL device 110 may be calculated as follows:

$$SL1 = \tfrac{1}{2}TO_C + \tfrac{1}{2}TO_A - \tfrac{1}{2}TO_B$$

$$SL1 = \tfrac{1}{2}(SL1_{TX} + SL2_{RX} + SL2_{TX} + SL1_{RX}) + \tfrac{1}{2}(BS_{TX} + SL1_{RX} + SL1_{TX} + BS_{RX}) - \tfrac{1}{2}(BS_{TX} + SL2_{RX} + SL2_{TX} + BS_{RX})$$

$$SL1 = SL1_{TX} + SL1_{RX} \quad (5)$$

The timing calibration value of second SL device 112 may be calculated as follows:

$$SL2 = \tfrac{1}{2}TO_C + \tfrac{1}{2}TO_B - \tfrac{1}{2}TO_A \quad (6)$$

The timing calibration value of BS 120 may be calculated as follows:

$$BS = TO_A - SL1 \quad (7)$$

Figure 5:
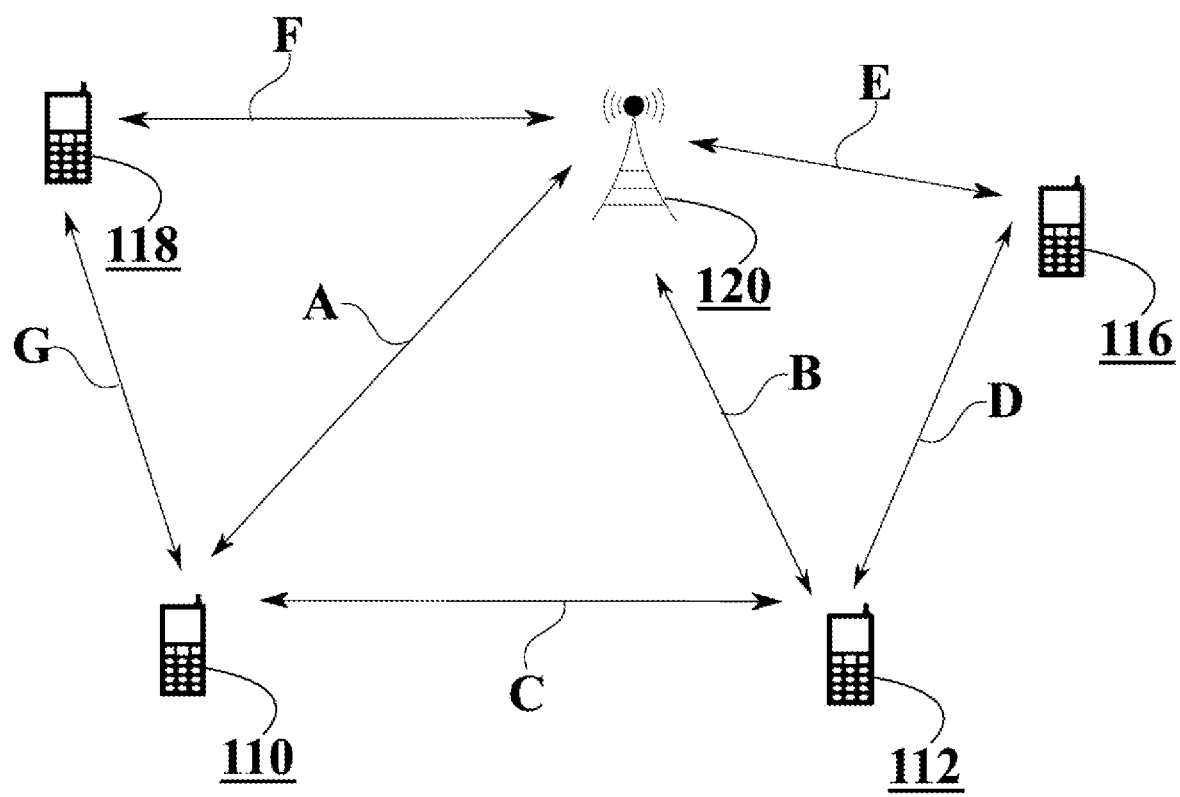
FIG. 5 illustrates a second network scenario for calculation of timing calibration values in accordance with at least some example embodiments.

FIG. 5 illustrates a second network scenario for calculation of timing calibration values in accordance with at least some example embodiments. Compared to the first network scenario illustrated in FIG. 4, the second network scenario illustrated in FIG. 5 comprises third SL device 116 and fourth SL device 118. In FIG. 5, a wireless communication link between second SL device 112 and third SL device 116 is denoted by D, a wireless communication link between BS 120 and third SL device 116 is denoted by E, a wireless communication link between BS 120 and fourth SL device 118 is denoted by F and a wireless communication link between first SL device 110 and fourth SL device 118 is denoted by G.

The timing calibration value for third SL device 110 and fourth SL device 112 may be calculated as follows.

The timing offset link of D may comprise at least the following delays:

$$TO_D = SL2_{TX} + PD_D + SL3_{RX} + SL3_{TX} + PD_D + SL2_{RX} - 2*PD_D$$

$$TO_D = SL2_{TX} + SL3_{RX} + SL3_{TX} + SL2_{RX} \quad (8)$$

The timing offset link of E may comprise at least the following delays:

$$TO_E = BS_{TX} + PD_E + SL3_{RX} + SL3_{TX} + PD_E + BS_{RX} - 2*PD_E$$

$$TO_E = BS_{TX} + SL3_{RX} + SL3_{TX} + BS_{RX} \quad (9)$$

The timing offset link of F may comprise at least the following delays:

$$TO_F = BS_{TX} + PD_F + SL4_{RX} + SL4_{TX} + PD_F + SL4_{RX} - 2*PD_F$$

$$TO_F = BS_{TX} + SL4_{RX} + SL4_{TX} + BS_{RX} \quad (10)$$

The timing offset link of G may comprise at least the following delays:

$$TO_G = SL1_{TX} + PD_G + SL4_{RX} + SL4_{TX} + PD_G + SL4_{RX} - 2*PD_G$$

$$TO_G = SL1_{TX} + SL4_{RX} + SL4_{TX} + SL1_{RX} \quad (11)$$

The timing calibration values of first SL device 110, second SL device 112 and BS 120 may be calculated using equations (5), (6) and (7), respectively. The timing calibration value of third SL device 116 may be calculated as follows:

$$SL3 = \tfrac{1}{2}TO_D + \tfrac{1}{2}TO_E - \tfrac{1}{2}TO_B \quad (12)$$

The timing calibration value of fourth SL device 118 may be calculated as follows:

$$SL4 = \tfrac{1}{2}TO_G + \tfrac{1}{2}TO_F - \tfrac{1}{2}TO_A \quad (13)$$

In some embodiments, the timing calibration values may be estimated for two different bandwidths showing the corresponding calibration improvements. The timing calibration values may be estimated for two different bandwidths for example using three tables.

In some embodiments, LMF 132 may perform determination of timing offset and calculation of timing calibration values. For instance, if SL devices are reachable by multiple Transmission and Reception Points, TRPs, such as BS 120 and several neighbour BSs, LMF may exploit the calibration procedure, at least partly.

As a first example, LMF 132 may prioritize BSs based on clock trustworthiness of the BSs. In such a case, the SL devices may receive an ordered list of BSs with which the SL devices should initiate the timing calibration procedure. The ordered list may be transmitted by LMF 132 for example via LTE Positioning Procedure, LPP, for initiating a timing calibration procedure. The SL devices may initiate the timing calibration procedure with a first BS of the list, compute at least one PD estimation accuracy metric, like variance and/or LOS probability), and based on the computed metric decide to start a clock alignment process with the first BS or alternatively, in case of low link quality, test a second BS of the list, and so forth.

As a second example, LMF 132 may select a group of BS with which SL devices should perform clock alignment. The group may be selected based on timing calibration values of said BS. That is, the group may be selected based on evaluating the clock accuracies of said BSs, i.e., LMF 132 may select a group of BS expected to exhibit similar clock accuracy or a group of BS that have synchronized their clocks with each other. LMF 132 may then transmit information about the selected group to SL devices, such as identities of the selected BSs, for clock alignment. In such a case, the SL devices may perform the calibration procedure via a multi-RTT type of approach, i.e. trigger simultaneous RTT sessions with each BS in the group and use the PD estimates to align clocks but also remove device-specific estimation biases, possibly via simple/double differences method similar to GNSS processing.

By applying the calibration procedure the timing error may be reduced, e.g., for Subcarrier Spacing, SCS, of 120 KHz between BS 120 from 116.25 ns to 50 ns and even more improvement may be achieved for the SLs where the timing error at SCS 120 KHz for an uncalibrated system may be 100 ns and with calibration reduced to 50 ns.

Figure 6:
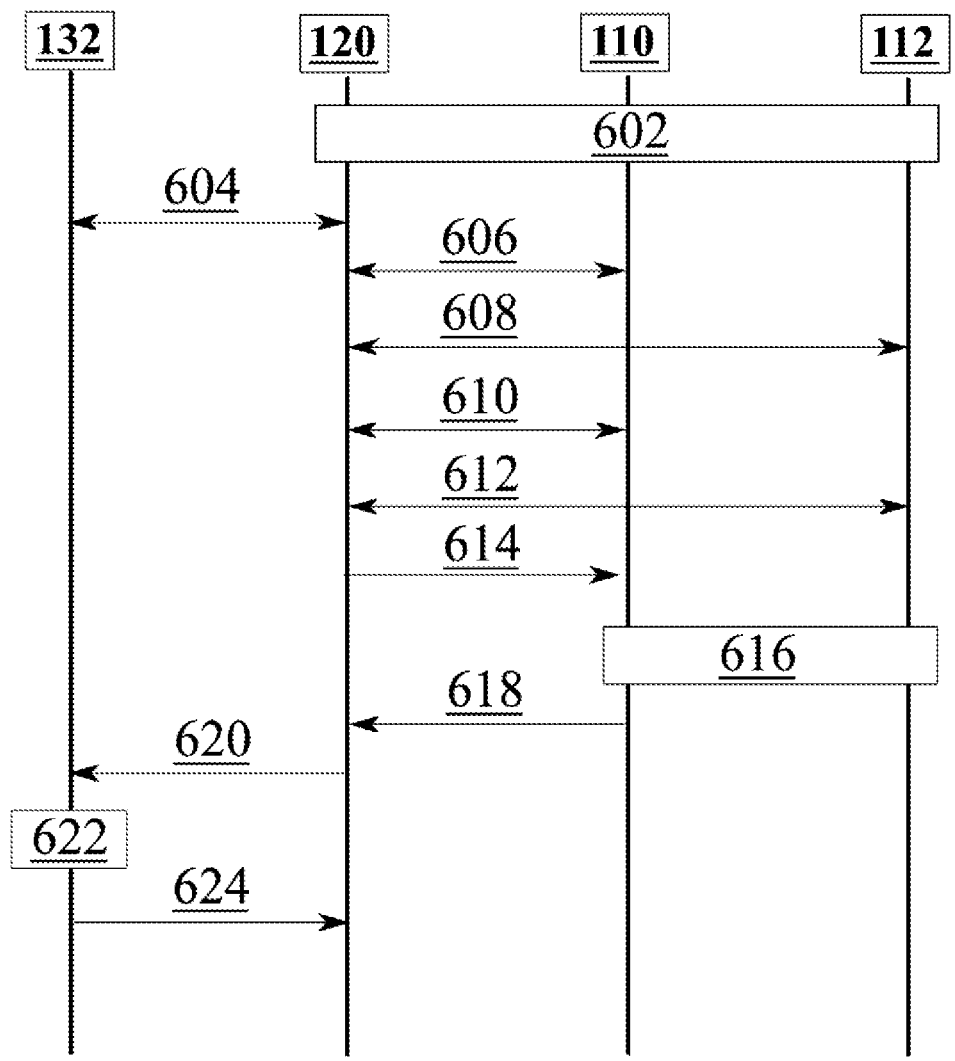
FIG. 6 illustrates a signalling graph in accordance with at least some example embodiments.

FIG. 6 illustrates a signalling graph in accordance with at least some example embodiments. With reference to FIG. 1, on the vertical axes are disposed, from the left to the right, LMF 132, BS 120, first SL 110 and second SL 112. Time advances from the top towards the bottom.

At step 602, a connection may be established, such as a Uu interface connection. At step 604, the calibration procedure may be initiated by LMF 132 and BS 120 may confirm the initiation of the calibration procedure. At step 606, BS 120 may transmit a request to first SL device 110, to request first SL device 110 to enter a calibration mode. At step 608, BS 120 may transmit a request to second SL device 112, to request second SL device 112 to enter the calibration mode as well.

At step 610, two-way delay measurements may be performed on the first wireless communication link A, i.e., the link between BS 120 and first SL device 110. That is, BS 120 may transmit calibration reference data and first SL device 110 may respond by transmitting a calibration reference data response. Message exchange may be repeated until stable timing measurement values are measured. BS 120 may determine the two-way delay of the link between BS 120 and first SL device 110 based on the message exchange. At step 612, BS 120 may perform two-way delay measurements on the second wireless communication link B, i.e., the link between BS 120 and second SL device 112.

At step 614, BS 120 may trigger two-way delay measurements on the third wireless communication link C, i.e., the link between first SL device 110 and second SL device 112, by transmitting a request to first SL device 110, to request first SL device 110 to measure the two-way delay of the link between first SL device 110 and second SL device 112. At step 616, a SL between first SL device 110 and second SL device 112 may be established, if the SL has not been established before. For instance, a connection on PC5 interface may be established. Two-way delay measurements may be performed by first SL device 110 on the first wireless link at step 616. At step 618, first SL device 110 may transmit a SL time measurement response comprising the measured two-way delay.

At step 622, BS 120 may transmit a response to LMF 132. The response may comprise the two-way delays of wireless communication links A, B and C. At step 622, LMF 132 may determine a timing offset of the first wireless link, a timing offset of the second wireless link and a timing offset of the third wireless link. LMF 132 may also calculate a timing calibration value of BS 120, a timing calibration value of first SL device 110 and a timing calibration value of second SL device 112 using the timing offset of the first wireless link, the timing offset of the second wireless link and the timing offset of the third wireless link. LMF 132 may calculate the timing calibration values using equations (5), (6) and (7).

In general, a timing calibration value may be used by a receiving device and in a RTT request both, transmitter and receiver, errors may be present, but that does not cause any harmful effects. Calibration in accordance with embodiments of the present invention therefore enables positioning of a movable device, e.g., based on an approach wherein LMF 132 may request positioning for the movable device and a RTT request may be scheduled. As the RTT involves transmitter and receiver latencies, handling of the calibration values as separate transmitter and receiver values is not needed.

Figure 7:
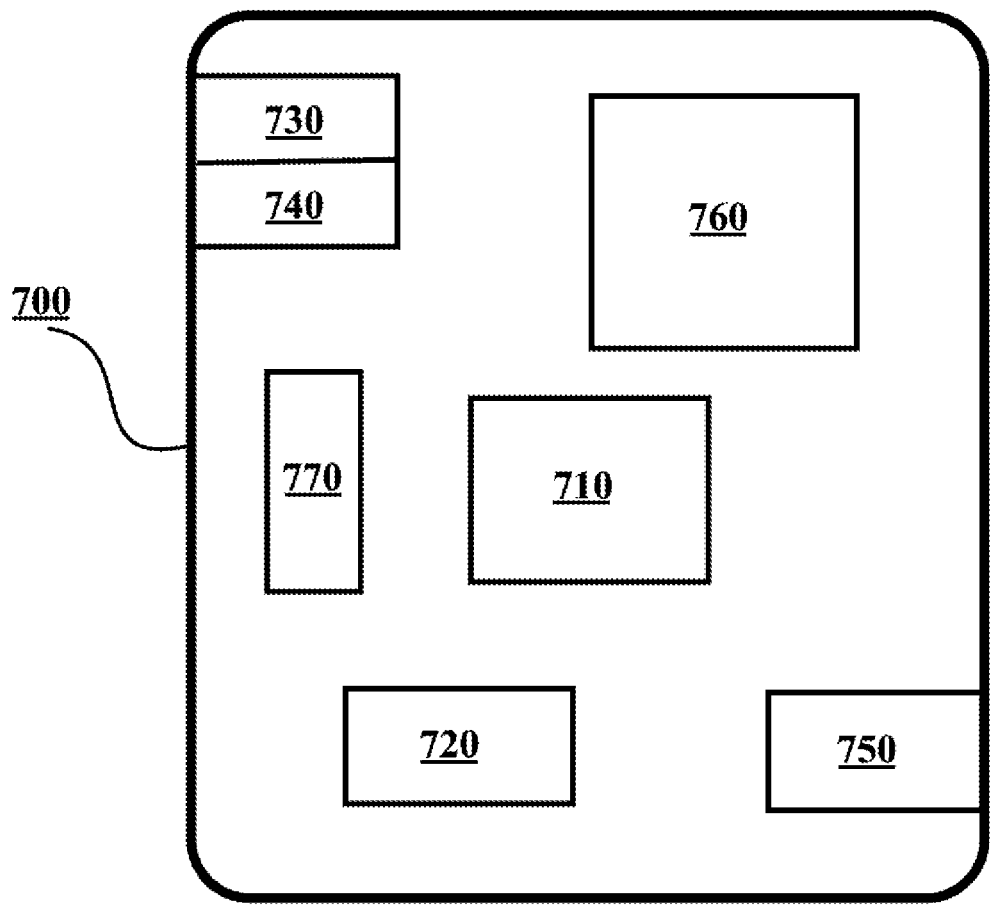
FIG. 7 illustrates an example apparatus capable of supporting at least some example embodiments.

FIG. 7 illustrates an example apparatus capable of supporting at least some example embodiments. Illustrated is device 700, which may comprise, for example, BS 120 or first SL device 110, or a device controlling functioning thereof, possibly when installed therein. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. Processor 710 may comprise at least one Application-Specific Integrated Circuit, ASIC. Processor 710 may comprise at least one Field-Programmable Gate Array, FPGA. Processor 710 may comprise at least one Qualcomm Snapdragon and/or Intel Atom processor. Processor 710 may comprise, for example, a Cortex-A8 processing core manufactured by ARM Holdings or a Steamroller processing core produced by Advanced Micro Devices Corporation. Processor 710 may be means for performing method steps in device 700, such as determining, causing transmitting and causing receiving. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with Global System for Mobile communication, GSM, Wideband Code Division Multiple Access, WCDMA, Long Term Evolution, LTE, and/or 5G/NR standards, for example.

Device 700 may comprise a Near-Field Communication, NFC, transceiver 750. NFC transceiver 750 may support at least one NFC technology, such as Bluetooth, Wibree or similar technologies.

Device 700 may comprise User Interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a Subscriber Identity Module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Device 700 may comprise further devices not illustrated in FIG. 7. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint sensor arranged to authenticate, at least in part, a user of device 700. In some embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected without departing from the scope of the embodiments.

Figure 8:
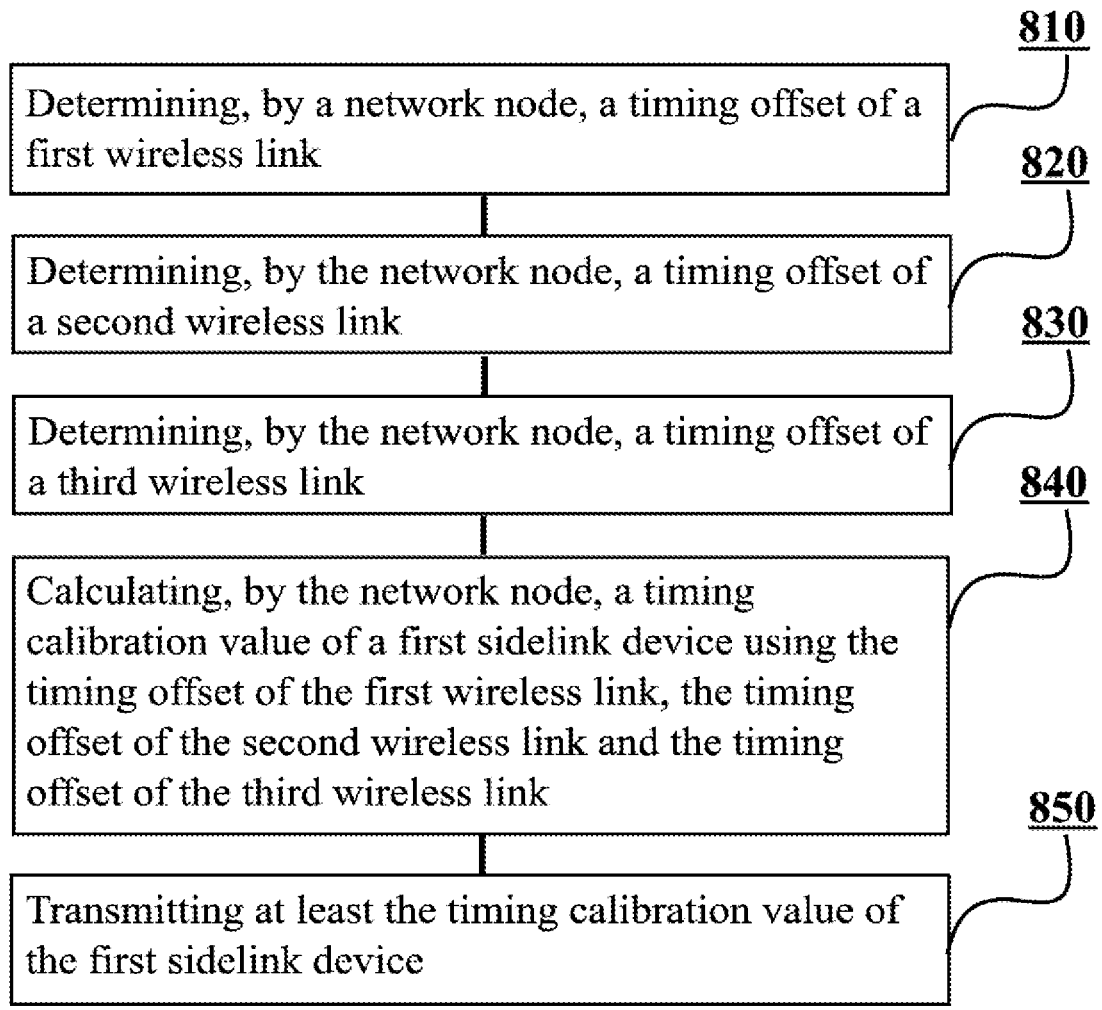
FIG. 8 illustrates a flow graph of a first method in accordance with at least some example embodiments.

FIG. 8 is a flow graph of a first method in accordance with at least some example embodiments. The phases of the illustrated first method may be performed by a network node, likes BS 120 or LMF 132, or a device controlling functioning thereof, possibly when installed therein.

The first method may comprise, at step 810, determining, by a network node, a timing offset of a first wireless link, wherein the first wireless link is a link between a wireless network node and a first sidelink device, and the timing offset of the first wireless link is based on a calculated two-way delay of the first wireless link and a measured two-way delay of the first wireless link. The first method may also comprise, at step 820, determining, by the network node, a timing offset of a second wireless link, wherein the second wireless link is a link between the wireless network node and a second sidelink device, and the timing offset of the second wireless link is based on a calculated two-way delay of the second wireless link and a measured two-way delay of the second wireless link. In addition, the first method may comprise, at step 830, determining, by the network node, a timing offset of a third wireless link, wherein the third wireless link is a link between the first sidelink device and the second sidelink device and the timing offset of the third wireless link is based on a calculated two-way delay of the third wireless link and a measured two-way delay of the third wireless link. The first method may also comprise, at step 840, calculating, by the network node, a timing calibration value of the first sidelink device using the timing offset of the first wireless link, the timing offset of the second wireless link and the timing offset of the third wireless link. Finally, the first method may comprise, at step 850, transmitting at least the timing calibration value of the first sidelink device.

Figure 9:
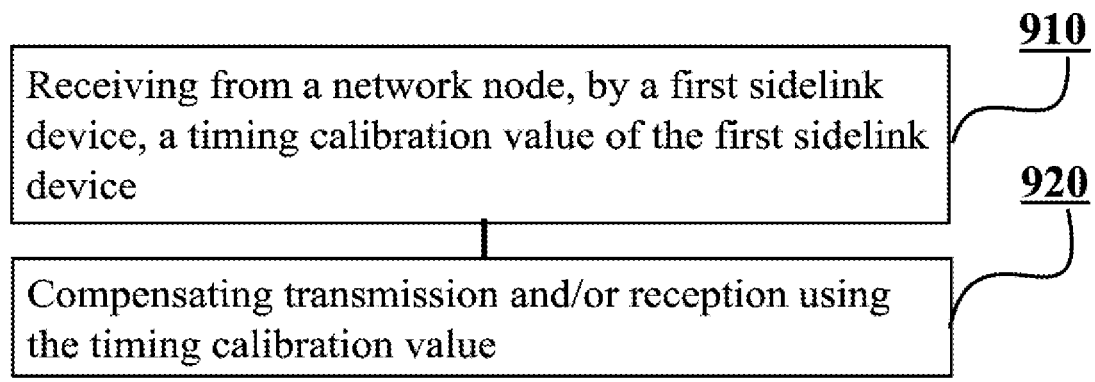
FIG. 9 illustrates a flow graph of a second method in accordance with at least some example embodiments.

FIG. 9 is a flow graph of a second method in accordance with at least some example embodiments. The phases of the illustrated second method may be performed by first SL device 110 or a device controlling functioning thereof, possibly when installed therein.

The second method may comprise, at step 910, receiving from a network node, by a first sidelink device, a timing calibration value of the first sidelink device, the timing calibration value being based on a timing offset of a first wireless link, a timing offset of a second wireless link and a timing offset of a third wireless link, wherein the first wireless link is a link between a wireless network node and the first sidelink device, the second wireless link is a link between the wireless network node and a second sidelink device and the third wireless link is a link between the first sidelink device and the second sidelink device. The second method may also comprise, at step 920, compensating transmission and/or reception using the timing calibration value.

FIG. 10 illustrates an example of calculating timing errors in accordance with at least some example embodiments. FIG. 11 illustrates an example of calculating timing errors without calibration in accordance with at least some example embodiments. FIG. 12 illustrates an example of calculating timing errors with calibration in accordance with at least some example embodiments.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, comprising for example BS 120 or first SL device 110, may further comprise means for carrying out the example embodiments described above and any combination thereof. The apparatus may be an apparatus of a cellular communication network, such as a 5G network, and comprise means for operating in the cellular communication network.

In an example embodiment, a computer program comprising instructions which, when the program is executed by a computer, cause the computer to carry out a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, comprising for example BS 120 or first SL device 110, may further comprise at least one processor, and at least one memory including computer program code, wherein the at least one memory and the computer program code are configured to, with the at least one processor, cause the apparatus at least to perform the example embodiments described above and any combination thereof. The apparatus may be an apparatus of a cellular communication network, such as a 5G network, and configured to operate in the cellular communication network.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some example embodiments find industrial application in cellular communication networks, such as 5G networks, and possibly in other cellular communication networks in the future as well.

Acronyms List

3GPP 3rd Generation Partnership Project
BB Baseband
BS Base Station
DFSE Downlink Frame Synchronization Error
GNSS Global Navigation Satellite System
GSM Global System for Mobile communication
IoT Internet of Things
LMF Location Management Function
LOS Line-of-Sight
LPP LTE Positioning Procedure
LTE Long-Term Evolution
M2M Machine-to-Machine
NFC Near-Field Communication
NR New Radio
PD Propagation Delay
PSCCH Physical Sidelink Control Channel
PSSCH Physical Sidelink Shared Channel
QoS Quality of Service
RAT Radio Access Technology
RRC Radio Resource Control
RSRP Reference Signal Receive Power
RF Radio Frequency
RU Radio Unit
SCI Sidelink Control Information
SL Sidelink
TAA Time Alignment Adjustment
TAE Time Alignment Error
TASS Time Alignment Step Size
TRP Transmission and Reception Point
UE User Equipment
UI User Interface
V2X Vehicle-to-Everything
WCDMA Wideband Code Division Multiple Access
WLAN Wireless Local Area Network

| REFERENCE SIGNS LIST | |
| --- | --- |
| 105, 115 | Air interfaces |
| 110, 112, 114, 116, 118 | SL devices |
| 120 | BS |
| 125, 135 | Wired interfaces |
| 130 | Core network |
| 132 | Network node |
| A, B, C, D, E, F, G | Wireless links |
| 602-624 | Steps in FIG. 6 |
| 700-770 | Structure of the apparatus of FIG. 7 |
| 810-850 | Phases of the method in FIG. 8 |
| 910-920 | Phases of the method in FIG. 9 |

The invention claimed is:

1. A method, comprising:
   determining, by a network node, a timing offset ($TO_A$) of a first wireless link, wherein the first wireless link comprises a link between a wireless network node and a first sidelink device, and the timing offset ($TO_A$) of the first wireless link is based on a calculated two-way delay of the first wireless link and a measured two-way delay of the first wireless link;
   determining, by the network node, a timing offset ($TO_B$) of a second wireless link, wherein the second wireless link comprises a link between the wireless network node and a second sidelink device, and the timing offset ($TO_B$) of the second wireless link is based on a calculated two-way delay of the second wireless link and a measured two-way delay of the second wireless link;
   determining, by the network node, a timing offset ($TO_C$) of a third wireless link, wherein the third wireless link comprises a link between the first sidelink device and the second sidelink device and the timing offset ($TO_C$) of the third wireless link is based on a calculated two-way delay of the third wireless link and a measured two-way delay of the third wireless link;
   calculating, by the network node, a timing calibration value of the first sidelink device using the timing offset ($TO_A$) of the first wireless link, the timing offset ($TO_B$) of the second wireless link and the timing offset ($TO_C$) of the third wireless link; and
   transmitting, by the network node, at least the timing calibration value of the first sidelink device, wherein the network node comprises a network node in a core network, and wherein the method further comprises:
   prioritizing base stations based on timing calibration values of said base stations and transmitting to sidelink devices an ordered list of said base stations for initiating a timing calibration procedure; and/or
   selecting a group of base stations based on timing calibration values of said group of base stations and transmitting information about the group to sidelink devices for clock alignment.

2. The method according to claim 1, wherein the network node comprises the wireless network node or a network node in a core network.

3. The method according to claim 1, wherein a timing offset is determined by subtracting a calculated two-way delay of a corresponding wireless link from a measured two-way delay of the corresponding wireless link.

4. The method according to claim 1, wherein the timing calibration value (SL1) of the first sidelink device is calculated as follows:

$$SL1 = \tfrac{1}{2}TO_C + \tfrac{1}{2}TO_A - \tfrac{1}{2}TO_B.$$

5. The method according to claim 1, wherein the timing calibration value (SL2) of the second sidelink device is calculated as follows:

$$SL2 = \tfrac{1}{2}TO_C + \tfrac{1}{2}TO_B - \tfrac{1}{2}TO_C.$$

6. The method according to claim 1, wherein the timing calibration value (NW) of the wireless network node is calculated as follows:

$$NW = TO_A - SL1.$$

7. The method according to claim 1, wherein the calculated two-way delay is two times a propagation delay between a transmitter and a receiver.

8. The method according to claim 1, wherein a measured two-way delay comprises a sum of two times a propagation delay between a transmitter and a receiver, a transmission and a reception delay at the transmitter, and a transmission and a reception delay at the receiver.

9. The method according to claim 1, wherein the calculated two-way delay is calculated based on a locations of a transmitter and a location of a receiver.

10. The method according to claim 1, further comprising:
    detecting, before said determining steps, that there is a line-of-sight connection on the first wireless link, the second wireless link, and the third wireless link.

11. The method according to claim 1, wherein the network node comprises the wireless network node, and wherein the method further comprises:
    transmitting the timing calibration value of the first sidelink device to the first sidelink device; and/or
    transmitting the timing calibration value of the second sidelink device to the second sidelink device.

12. The method according to claim 1, further comprising:
    calculating a timing calibration value of the wireless network node and a timing calibration value of the second sidelink device using the timing offset ($TO_A$) of the first wireless link, the timing offset ($TO_B$) of the second wireless link and the timing offset ($TO_C$) of the third wireless link.

13. The method according to claim 1, further comprising:
    transmitting a request to the first sidelink device, to request the first sidelink device to measure the two-way delay of the third wireless link; and
    receiving the measured two-way delay of the third wireless link from the first sidelink device.

14. An apparatus, comprising:
    at least one processing core; and
    at least one memory including computer program code, the at least one memory and the computer program code being configured to, with the at least one processing core, cause the apparatus at least to:
    determine a timing offset ($TO_A$) of a first wireless link, wherein the first wireless link comprises a link between a wireless network node and a first sidelink device, and the timing offset ($TO_A$) of the first wireless link is based on a calculated two-way delay of the first wireless link and a measured two-way delay of the first wireless link;
    determine a timing offset ($TO_B$) of a second wireless link, wherein the second wireless link comprises a link between the wireless network node and a second sidelink device, and the timing offset ($TO_B$) of the second wireless link is based on a calculated two-way delay of the second wireless link and a measured two-way delay of the second wireless link;
    determine a timing offset ($TO_C$) of a third wireless link, wherein the third wireless link comprises a link between the first sidelink device and the second sidelink device and the timing offset ($TO_C$) of the third wireless link is based on a calculated two-way delay of the third wireless link and a measured two-way delay of the third wireless link;
    calculate a timing calibration value of the first sidelink device using the timing offset ($TO_A$) of the first wireless link, the timing offset ($TO_B$) of the second wireless link and the timing offset ($TO_C$) of the third wireless link; and
    transmit at least the timing calibration value of the first sidelink device, wherein the apparatus comprises a network node in a core network, and wherein the apparatus is further caused to:
    prioritize base stations based on timing calibration values of said base stations and transmitting to sidelink devices an ordered list of said base stations for initiating a timing calibration procedure; and/or select a group of base stations based on timing calibration values of said group of base stations and transmitting information about the group to sidelink devices for clock alignment.

* * * * *